June 22, 1965 W. E. RIPPER ETAL 3,190,590
AERIAL SPRAYING OF SOIL OR CROPS THEREON
Filed Feb. 17, 1964 2 Sheets-Sheet 1
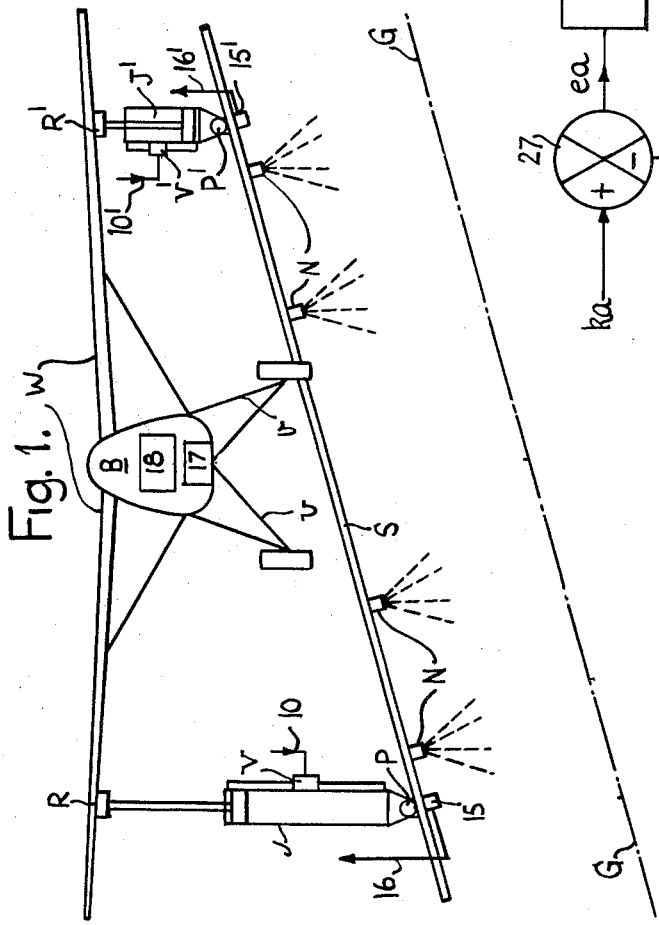
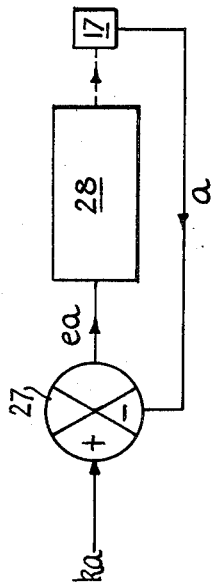
Inventors:
Walter Eugene Ripper
and
Kenneth Charles Garner
By Baldwin & Wight
Attorneys

United States Patent Office 3,190,590
Patented June 22, 1965

3,190,590
AERIAL SPRAYING OF SOIL OR CROPS THEREON
Walter Eugene Ripper, Docking, King's Lynn, Norfolk, and Kenneth Charles Garner, Cranfield, Bletchley, England, assignors to Ripper Robots Limited, Norfolk, England, a corporation of Great Britain
Filed Feb. 17, 1964, Ser. No. 345,350
Claims priority, application Great Britain, Feb. 21, 1963, 7,091/63
4 Claims. (Cl. 244—136)

This invention relates to airborne devices for spraying the ground or crops growing thereon with such agents, for instance, as pesticides, fungicides, herbicides, fertilizers and seeds, which may be in solid form (dust, granular materials, seeds and the like) or in liquid, aerosol, vapour or gaseous form, hereinafter referred to comprehensively as the "spray" or the "spray medium."

More particularly the invention relates to an aircraft on which is mounted transversely a hollow bar, hereinafter called the "spray bar," fed with the spray medium from a container in the aircraft and having nozzles or like spray ejection devices distributed along its length and facing in a generally downward direction.

In carrying out spraying operations of the kind envisaged, it is important that the aircraft be flown very near the ground and that the height above the ground of the spray bar should be not only small, say two metres or even less, but be kept constant to a high degree of accuracy. It is moreover desirable to keep the spray bar parallel to the ground beneath it.

Means enabling the aircraft to be flown at a constant (small) height from the ground, comprising an accurate height-above-ground measuring device emitting signals, which are fed to a visual indicator for the pilot or to an auto-pilot system, are known or have been proposed and are to be employed in conjunction with other devices characteristic of the present invention hereinafter described.

However, the means above referred to, while capable of enabling a constant average height of the aircraft above the ground to be maintained may not respond quickly enough to enable the aircraft to follow short-pitched and pronounced undulations of the ground level. In this connection the aerodynamic stability characteristic of the aircraft itself are an important factor and in many cases the control imposed by an auto-pilot system may not be dead-beat, but produce a damped oscillation in height above ground.

Moreover, signals from a single aircraft height measuring device cannot be used for controlling the lateral attitude (bank) of the aircraft, so that to work a terrain having a general slope in any particular direction, the aircraft must be flown either up or down the slope, but not across it. For example, if the general slope is from N. to S., the aircraft must only be flown from N. to S. (or S. to N.)

The present invention aims to overcome these disadvantages by automatically adjusting the height of the spray bar relatively to the aircraft so as to compensate temporary or transient deviations from the desired mean of the aircraft's height from the ground; and as a further refinement, adjusting the inclination of the spray bar relatively to the aircraft to maintain it in substantial parallelism with the ground surface, when the latter is (temporarily or generally) not horizontal in the direction transverse to the aircraft's heading.

According to this invention, in aircraft having a spray bar disposed transversely of the aircraft's fore and aft axis, the spray bar is suspended from the airframe on one or more substantially vertical, linear actuators, such for example as hydraulic, pneumatic, or electric jacks, whose stroke is automatically controlled by electrical means responsively to demand signals for height above ground of the aircraft and spray bar respectively and to signals from quick-acting and accurate height-above-ground measuring devices mounted respectively on the airframe and on the spray bar, in such a way as to transmit to the actuator-adjusting mechanism an output signal (or signals) representative of actuator extension error, and thereby cause the actuator(s) to be adjusted so as to nullify such error.

According to an optional feature of the invention, the spray bar is suspended on two linear actuators, disposed symmetrically on either side of the aircraft's fore and aft axis, and the spray bar carries two, likewise symmetrically disposed, height-above-ground measuring devices, whose respective signals are combined, in the said electrical controlling means, with that of the said aircrafts' height measuring device and with the said demand signals, to transmit to each of the actuator-adjusting mechanisms the appropriate extension-error signal.

The incorporation of the above described optional feature enables the attitude in "roll" of the spray bar to be automatically adjusted to maintain it parallel to ground sloping transversely of the aircraft's heading.

One embodiment of the invention is illustrated, by way of example only, in the accompanying drawings, of which:

FIG. 1 is a schematic front elevation of an aircraft provided with a spray bar;

FIG. 4 is an additional control loop diagram.

Figure 2:
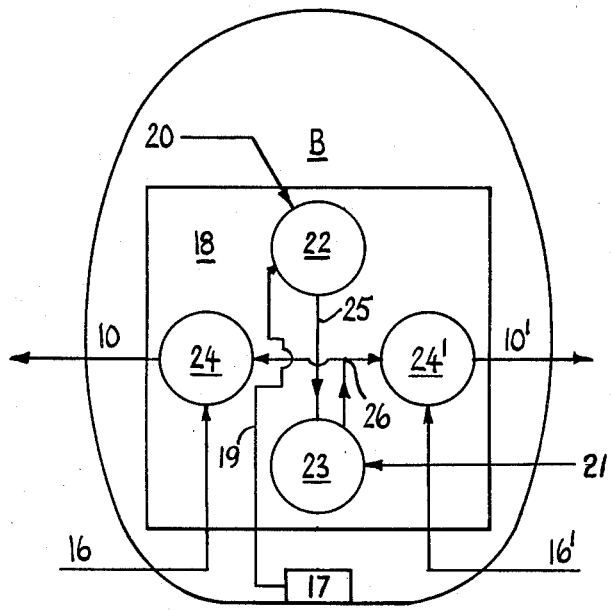
FIG. 2 illustrates detail of the same on an enlarged scale.

Referring to FIG. 1, the aircraft is a high-wing monoplane comprising a body B, a wing W and an undercarriage U. Suspended from the wing is a spray bar S having downwardly directed spray nozzles N distributed along its length. The aircraft is represented as flying level (with no bank) over ground sloping transversely to the aircraft's heading represented by a chain-dotted line G.

The spray bar is suspended from the wing on two substantially vertical hydraulic jacks J and J', which are connected to the wing at points symmetrically disposed on either side of the aircraft's centre line by means of substantially rigid joints R, R'; and the lower ends of the jacks are connected to the spray bar by pin joints P, P'. The jacks are controlled by hydraulic valves V, V' connected by means not illustrated with a source of pressure liquid and with an exhaust reservoir, also not illustrated. The valves are operated by servo-mechanisms (not illustrated) which are electrically controlled by signals transmitted through leads 10, 10'.

On the spray bar are mounted, symmetrically with respect to the aircraft's centre line at points substantially coinciding with the joints P, P', height responsive devices 15, 15', whose (electrical) outputs, which are measures of the height above the ground level G of the respective devices 15, 15', are fed to leads 16, 16'. Within the body B are a height responsive device 17, whose (electrical) output measures the height above the ground level G of a fixed point in the aircraft, and a signal summing and amplifying unit 18 receiving signals from leads 16, 16' and the device 17, together with manually controlled or pre-set demand signals, for height above ground of the aircraft and spray bar respectively, transmitted by leads 20, 21, the signal from device 17 being transmitted by a lead 19.

Referring to FIG. 2, the unit 18 comprises four summing and amplifying networks 22, 23, 24, 24' connected to the leads 19, 20, 21, 16, 10, 16', 10' as follows:

Lead 21 to network 23;
Leads 19, 20 to network 22;
Leads 16, 10 to network 24;
Leads 16', 10' to network 24';

a lead 25 conveys an output signal from network 22 to network 23 and a branched lead 26 conveys an output signal from network 23 to networks 24 and 24'.

Leads 16, 16' carry signals from the starboard and port devices 15, 15' representing the actual heights above ground $bs$ and $bp$, respectively, of these devices. Lead 19 carries a signal from device 17 representing the actual height above ground $a$ of the aircraft. The required heights above ground of the aircraft, $ka$ and of the spray bar $kb$ are carried by the leads 20 and 21 respectively.

Assume that the aircraft is flying without bank and that the ground slopes transversely to the aircraft's heading, as shown in FIG. 1. Since the aircraft's height above ground is to be separately controlled (see description of FIGURE 4 below), the jack-extension errors $es$ (starboard) and $ep$ (port) are determined by comparing the actual heights above ground $bs$ and $bp$ signalled by the devices 15, 15', not directly with the required spray bar height above ground $kb$, but with a quantity $d=kb+a-ka$ so that $es=d-bs$ and $ep=d-bp$.

The control loop diagram (FIG. 3) shows how the jack-extension errors are measured and applied to the jack servo-valves V, V' by the networks 22, 23, 24, 24' of FIG. 2.

Network 22 subtracts the signal $a$ from signal $ka$ to produce an output signal $ka-a$ applied to network 23 together with signal $kb$, from which is thereby subtracted the signal $ka-a$ to produce an output signal representing the quantity $d$. Networks 24, 24' add the signals $bs$ and $bp$ respectively from the signal $d$ to produce output signals representing the jack extension errors $bs$ and $ep$ which are applied to the servo-valves V, V' respectively causing the latter to operate until the errors are nullified, thus closing the control loops as shown by dotted arrows.

It is to be noted that in certain cases, e.g. when the aircraft is traversing ground which is rough or carries a standing crop, the signals emitted by the height measuring devices, if the latter are capable of very fine resolution, will contain too much detail, in the form of high frequency components. To eliminate these unwanted components suitable filters of known type (not illustrated) may be included in the summing and amplifying networks. Similar filters may also be introduced to eliminate the effect of structurally-induced signals, due for instance to flexibility of the spray bar.

It will be observed by reference to FIG. 1 that when the jacks J, J' are fully extended, the spray bar is below the level defined by the lowest points of the undercarriage. The complete system therefore includes means (not illustrated, since they form no part of the invention) for switching out of circuit the leads 10, 10' conveying the jack length error signals to the servo-mechanisms operating the jack valves V, V' and applying to these servo-mechanisms signals causing both jacks to be fully retracted during the manoeuvres of take-off and landing.

The system for controlling the height above ground of the aircraft does not, in itself form part of the invention, but its control loop is illustrated in FIG. 4 for the sake of completeness.

In FIG. 4 the demand signal representing the required height $ka$ above ground (of the device 17) and the signal emitted by the device 17 representing its actual height above ground $a$ are received by a summing and amplifying network 27 which emits a signal representing the difference of the required and actual heights, i.e. the height error $ea=ka-a$. The height error signal is transmitted to the system 28 which controls the aircraft's vertical movements (which system may include a human operator (pilot) or, preferably, an auto-pilot) so as to nullify the error signal. Closure of the loop is conventionally illustrated by a dotted arrow.

Figure 3:
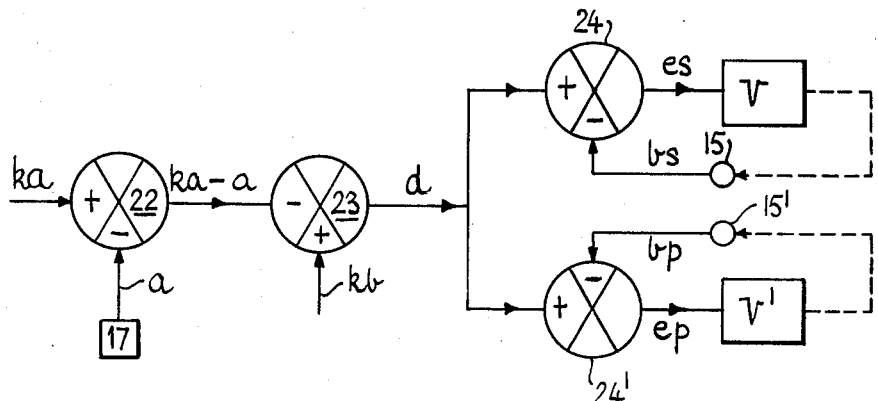
FIG. 3 is a control loop diagram of automatic devices installed in the aircraft.

It will be observed that the network 27 of FIG. 4 receives and transmits the same signals as network 22 of FIG. 3. In practice therefore only one such network will be necessary, the control loops of FIGS. 3 and 4 being combined.

The reason for making the joints R, R' of FIG. 1 substantially rigid is to keep the centre point of the spray bar S vertically below the centre line of the aircraft. Some "play" in these joints must be provided to allow the spray bar to take up positions oblique to the horizontal. Alternatively, the pin joints P, P' could be given limited sliding freedom on the spray bar, while maintaining complete rigidity of the joints R, R'.

What is claimed is:

1. An aircraft including means for spraying the ground beneath it comprising a hollow spray bar, spraying nozzles on said spray bar, means suspending said spray bar from the aircraft at a position below the aircraft and transversely of the aircraft's heading, said means comprising at least one linear actuator, by which the spray bar can be raised and lowered relatively to the aircraft, electrical means controlling the extension of said actuator, a device for accurately measuring and signalling the instantaneous height above ground of the aircraft, at least one device mounted on the spray bar at a definite point thereof for accurately measuring and signalling the instantaneous height above ground of said point, means receiving demand signals for height above ground of the aircraft and of the spray bar respectively, means transmitting to said extension-controlling means said demand signals and the signals of said height measuring devices, said extension-controlling means including means for algebraically summing the signals it receives to produce, and transmit to the actuator an output signal representing the error of actuator extension, the actuator having control means responsive to said error signal for correcting the signalled error.

2. An aircraft including means for spraying the ground beneath it comprising a hollow spray bar, spraying nozzles on said spray bar, means suspending said spray bar from the aircraft at a position below the aircraft and transversely of the aircraft's heading, said means comprising two linear actuators by which the spray bar can be raised and lowered and tilted relatively to the aircraft, electrical means controlling the extension of said actautors, a device for accurately measuring and signalling the instantaneous height above ground of the aircraft, two devices mounted on the spray bar at points thereof symmetrically disposed with respect to the aircraft's center line for accurately measuring and signalling their instantaneous heights above ground, means receiving demand signals for height above ground of the aircraft and of the spray bar respectively, means transmitting to said extension-controlling means said demand signals and the signals of said height measuring devices, said extension-controlling means including means for algebraically summing the signals it receives to produce and transmit to the actuators output signals representing the respective errors of actuator extension, said actuators having control means responsive to said error signals for correcting the signalled errors.

3. Aircraft as defined in claim 1 in which the electrical actuator-extension-controlling means comprises summing and amplifying networks serially disposed, to receive the input signals, namely the demand signals and the height measuring signals, and combine the same to produce an output error signal, each such network receiving and combining two signals and transmitting an output signal to the next network of the series, the final output signal being transmitted to the control means of the actuator.

4. Aircraft as defined in claim 2, in which the electrical, actuator-extension-controlling means comprises summing and amplifying networks serially disposed, to receive the input signals, namely the demand signals and the height measuring signals, and combine the same to produce output error signals, each such network receiving and combining two signals and transmitting an output signal to the next network of the series, the final output signals being transmitted to the control means of the respective actuators.

No references cited.

FERGUS S. MIDDLETON, *Primary Examiner.*